(12) United States Patent
Wu et al.

(10) Patent No.: US 8,379,077 B2
(45) Date of Patent: Feb. 19, 2013

(54) AUTOMATIC LAYOUT AND SPEAKER SELECTION IN A CONTINUOUS PRESENCE VIDEO CONFERENCE

(75) Inventors: Duanpei Wu, San Jose, CA (US); Herbert M. Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 268 days.

(21) Appl. No.: 12/953,524

(22) Filed: Nov. 24, 2010

(65) Prior Publication Data
US 2012/0127262 A1   May 24, 2012

(51) Int. Cl.
*H04N 7/14* (2006.01)
(52) U.S. Cl. ............... 348/14.09; 348/14.08; 348/14.12
(58) Field of Classification Search .... 348/14.01–14.16; 370/260, 261; 715/753, 756; 709/204, 231
See application file for complete search history.

(56) References Cited

U.S. PATENT DOCUMENTS

| | | | |
|---|---|---|---|
| 6,288,740 B1 * | 9/2001 | Lai et al. | 348/14.09 |
| 7,321,384 B1 | 1/2008 | Wu et al. | |
| 7,932,920 B2 * | 4/2011 | Lia et al. | 348/14.09 |
| 2008/0068449 A1 | 3/2008 | Wu et al. | |
| 2011/0115876 A1 * | 5/2011 | Khot et al. | 348/14.09 |

* cited by examiner

*Primary Examiner* — Melur Ramakrishnaiah
(74) *Attorney, Agent, or Firm* — Edell, Shapiro & Finnan, LLC

(57) ABSTRACT

Techniques are provided for managing display layouts for a continuous presence video conference. Each display layout has a fixed number of positions, and one of the display layouts has a maximum number of positions for display to participants in the video conference. The display layouts comprise video display positions for participants in a video conference. When the number of participants is greater than a threshold, one of the positions in that layout is used as a shared position assigned to a video stream of participants not assigned to fixed positions in that layout. The shared position is used in a scanning manner such that video streams of participants not assigned to fixed positions in the layouts are classified as scanning streams and are displayed in the non-fixed (shared) position over a predetermined time interval.

20 Claims, 7 Drawing Sheets

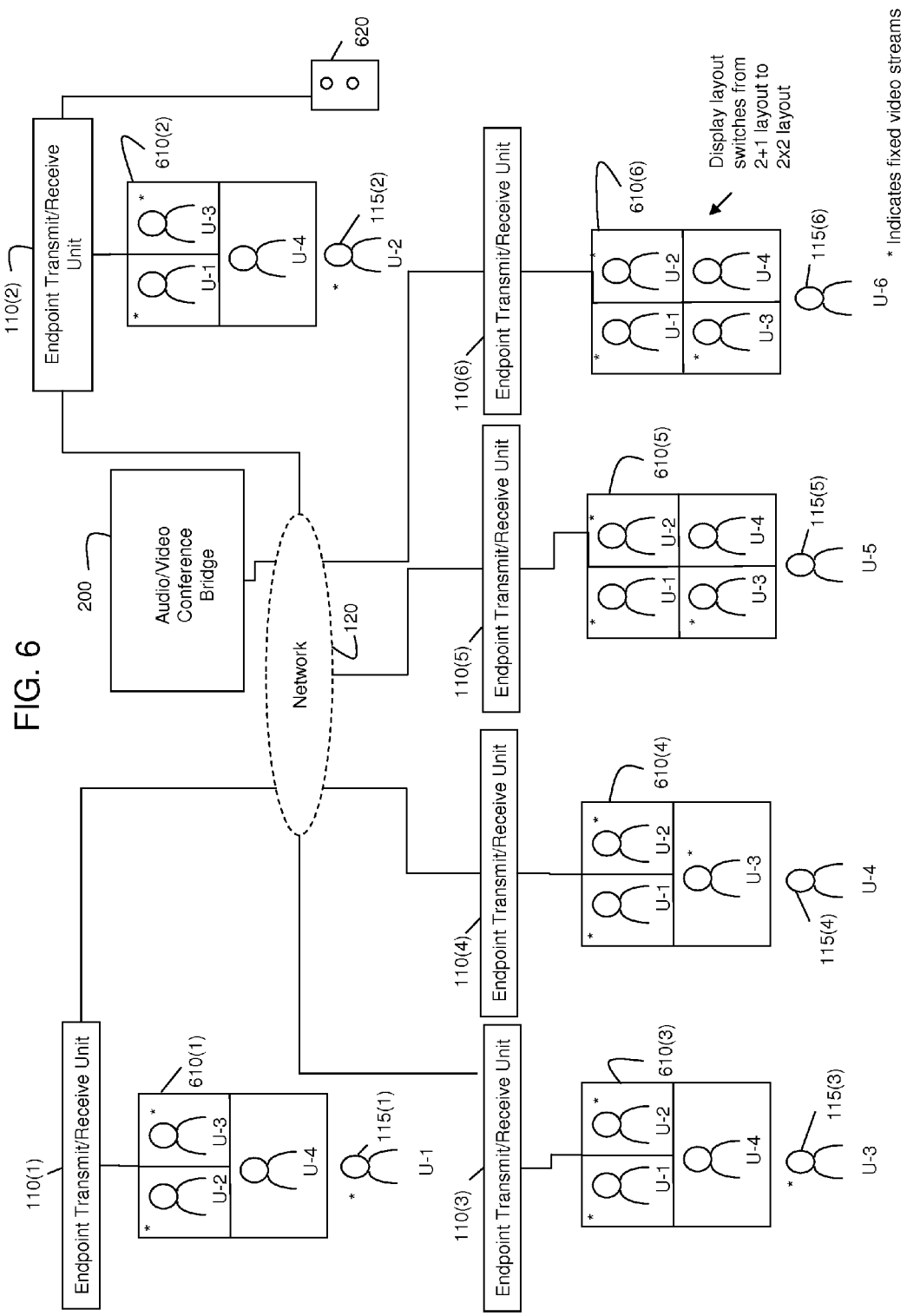

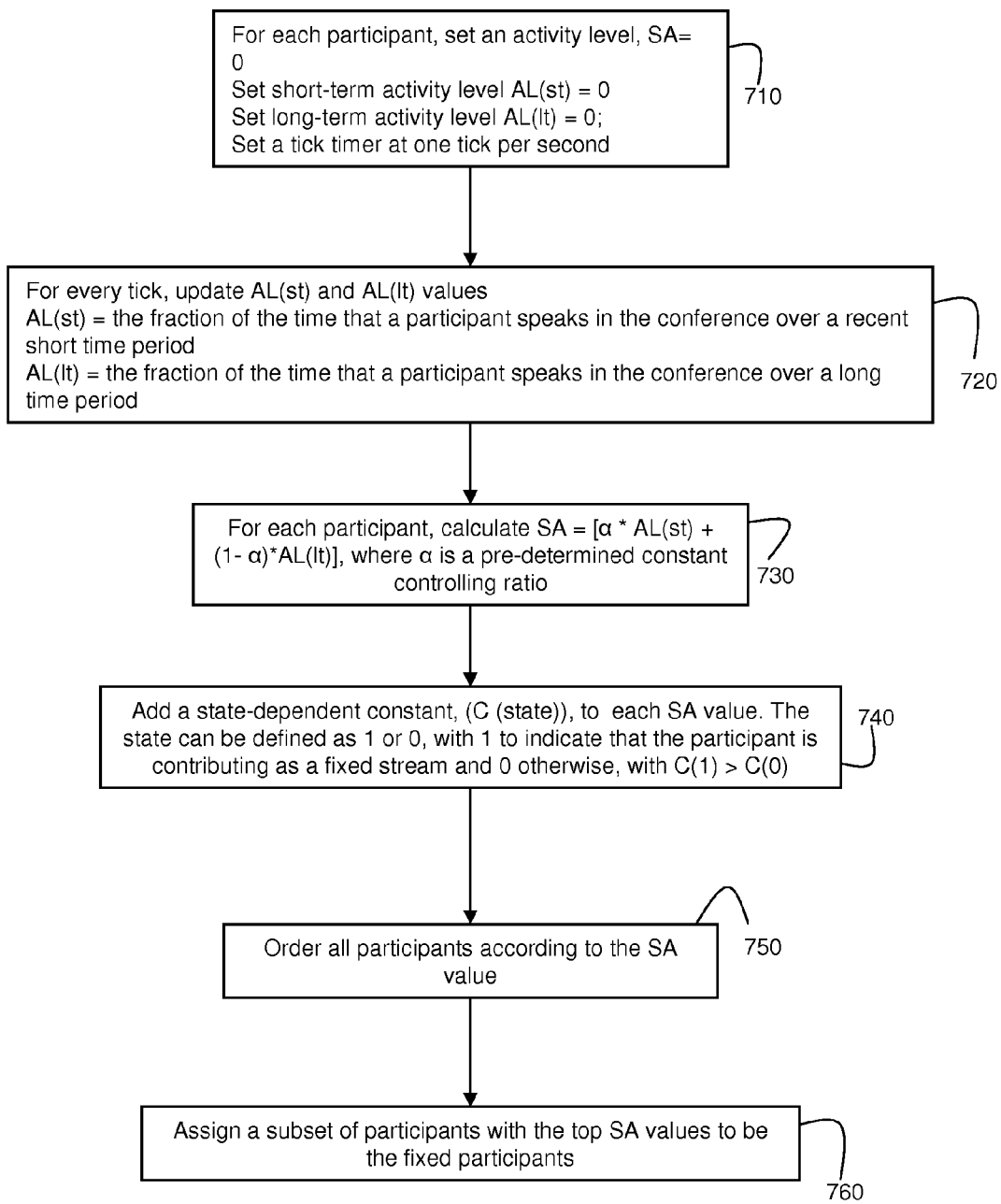

AUTOMATIC LAYOUT AND SPEAKER SELECTION IN A CONTINUOUS PRESENCE VIDEO CONFERENCE

TECHNICAL FIELD

The present disclosure relates to video conferencing.

BACKGROUND

Continuous presence is a video conferencing feature that permits participants in a conference to see multiple other participants simultaneously. Continuous presence features are included in some multi-point control units (MCUs) that manage video presentation to endpoints in a video conference session. Continuous presence enabled MCUs can transmit a composite video stream including two or more individual video streams showing respective conference participants to one or more video conferencing endpoints. The composite video stream can be presented in a video layout structure that includes a respective area for each included individual video stream. An MCU can transmit layout and video position information position for a given individual video stream in a layout can be assigned by an MCU and transmitted along with the composite video to multiple endpoints.

BRIEF DESCRIPTION OF THE DRAWINGS

FIG. 6 shows an example audio/video network environment and multiple display layout positions for fixed video streams and for selected/scanning video streams.

FIG. 7 is a flow chart depicting example operations for measuring active levels of each participant in the conference for purposes of selecting a video stream for one of the display layout positions.

DESCRIPTION OF EXAMPLE EMBODIMENTS

Overview

Techniques are provided for automatically managing the display layout for a continuous presence video conference. A conference bridge apparatus is provided that is configured to communicate with a plurality of endpoint units that are to participate in a video conference. Data representing a plurality of display layouts is stored at the conference bridge apparatus. Each display layout has a fixed number of positions, and one of the display layouts has the maximum number of positions for display to participants in the video conference. The display layouts comprise video display positions (in a composite video signal) for participants in a video conference session. The conference bridge apparatus determines the number of participants in the video conference and compares the number of participants to a threshold. When the number of participants in the video conference is less than or equal to the threshold, the conference bridge apparatus selects a first display layout of the plurality of display layouts based on the number of participants and assigns the video stream for each participant in the video conference to a corresponding video display position in the first display layout. When the number of participants is greater than the threshold, a second display layout is selected in which video display positions are fixed for video streams for a subset of the participants and video streams of multiple remaining participants that are not in the subset of participants are selectively switched for display in at least one display position.

Example Embodiments

Figure 1:
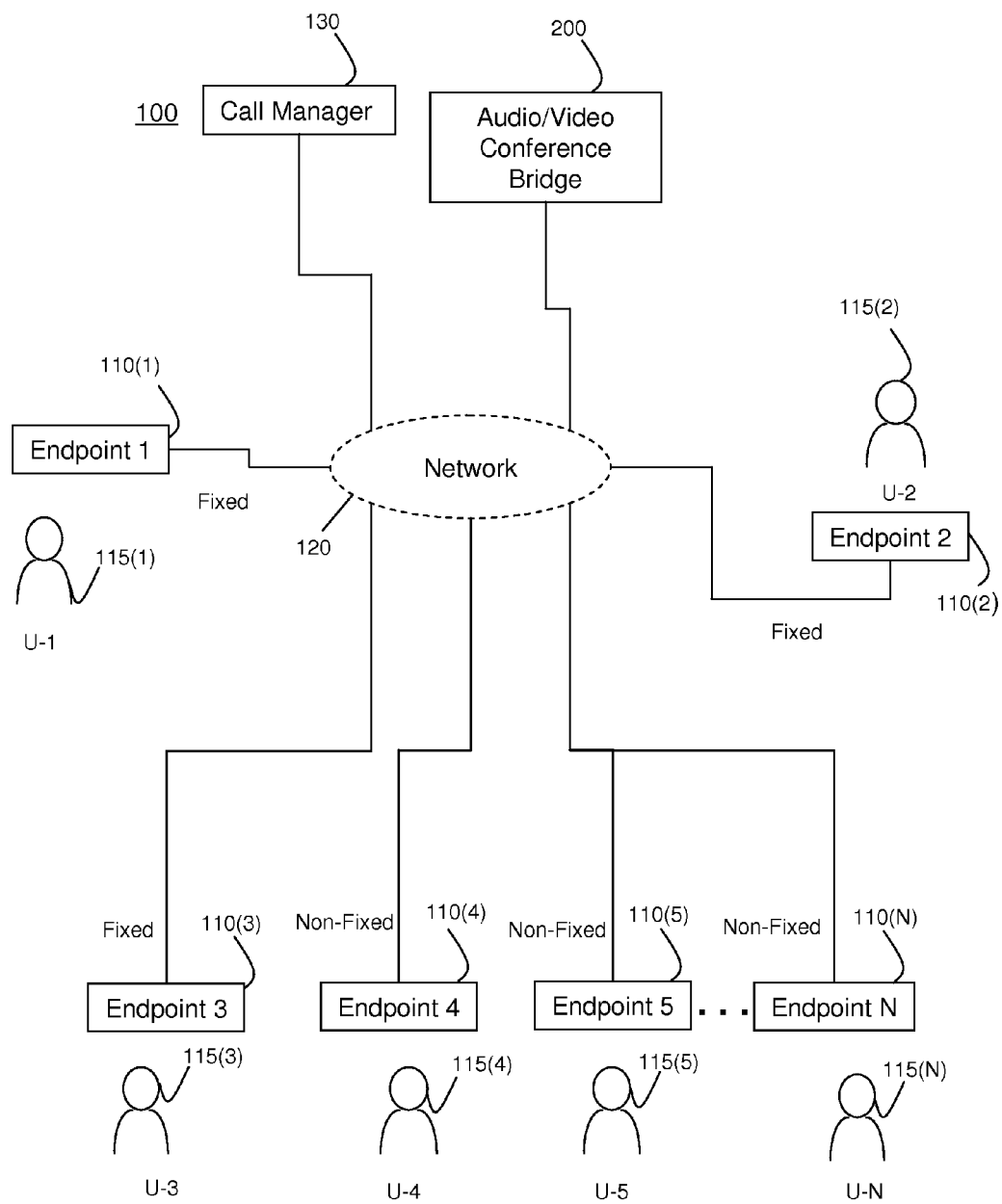
FIG. 1 depicts an example audio/video network environment featuring an audio/video conference bridge apparatus configured to select display layouts for participants of a conference and to assign the participants to display positions in the display layouts.

FIG. 1 shows an example of an audio/video network environment 100 in which a plurality of participants at respective conference endpoints 110(1)-110(N) participate in an audio/video conference. An audio/video conference involving sharing of audio and video from participants at respective endpoints is referred to throughout this disclosure as an audio/video conference, a video conference, or a conference. These terms and phrases are used interchangeably unless indicated otherwise. An audio/video conference bridge apparatus 200 is configured to select one or more display layouts for a conference session, assign participant video streams to display positions in the display layouts and transmit the display layouts with the participant video streams (e.g., in the form of composite video streams) to the conference endpoints. The phrase "composite video," as used in this disclosure, refers to video having video combined from two or more sources, e.g., two video conference endpoint cameras. Such use should not be confused with the analog video format that includes luminance and chrominance signals commonly used on standard definition analog video equipment.

The plurality of endpoint units 110(1)-110(N) communicate with the audio/video conference bridge 200 via a network 120 to transmit and receive audio and video data (e.g., video streams with included audio) to participants in the conference. The participants U-1 to U-N, shown at reference numerals 115(1)-115(N), are located at each endpoint unit, such that video streams of each participant U-1 to U-N are transmitted to the audio/video conference bridge 200 via the respective endpoint unit. For example, endpoint 110(1) is configured to transmit video streams of participant U-1 to the audio/video conference bridge 200, endpoint 110(2) is configured to transmit video streams of participant U-2 to the audio/video conference bridge 200, and so on for all N participants located at the N endpoint units. Similarly, endpoint 110(1) is configured to receive video streams from the audio/video conference bridge 200 to be displayed to participant U-1, endpoint 110(2) is configured to receive video streams from the audio/video conference bridge 200 to be displayed to participant U-2, and so on. Though FIG. 1 shows only one participant per endpoint unit, it should be appreciated that each endpoint unit may have multiple corresponding participants located at that endpoint.

One or more of participants U-1 to U-N may participate in a video conference. A call manager 130 coordinates setting up of the conference for the endpoint units that are to participate in the conference. The video streams including audio and video data of each participant is captured and transmitted by respective endpoint units 110(1)-110(N) across the network 120 to the audio/video conference bridge 200. Similarly, video streams including audio and video data of each participant may be sent from audio/video conference bridge 200 across network 120 to each endpoint unit 110(1)-110(N). As a result, each participant in the video conference can view video streams of the other participants in the video conference. As described in further detail below, the audio/video conference bridge 200 may, for example, select an appropriate display layout based on the number of participants in the conference and assign participants to corresponding display positions in the selected display layout. In another example, the audio/video conference bridge 200 may change the selected display layout based on whether new participants join the conference or drop out of the conference. In a further example, the audio/video conference bridge 200 may change the properties of display positions within a selected display layout based on the number of participants in the conference and based on measured audio statistics for the participants in the conference. These techniques, among others, are described below.

As also shown in FIG. 1, the video stream from an endpoint unit may be a "fixed" stream and others may be "non-fixed" or "scanning streams", the meaning of which is described further hereinafter.

Figure 2:
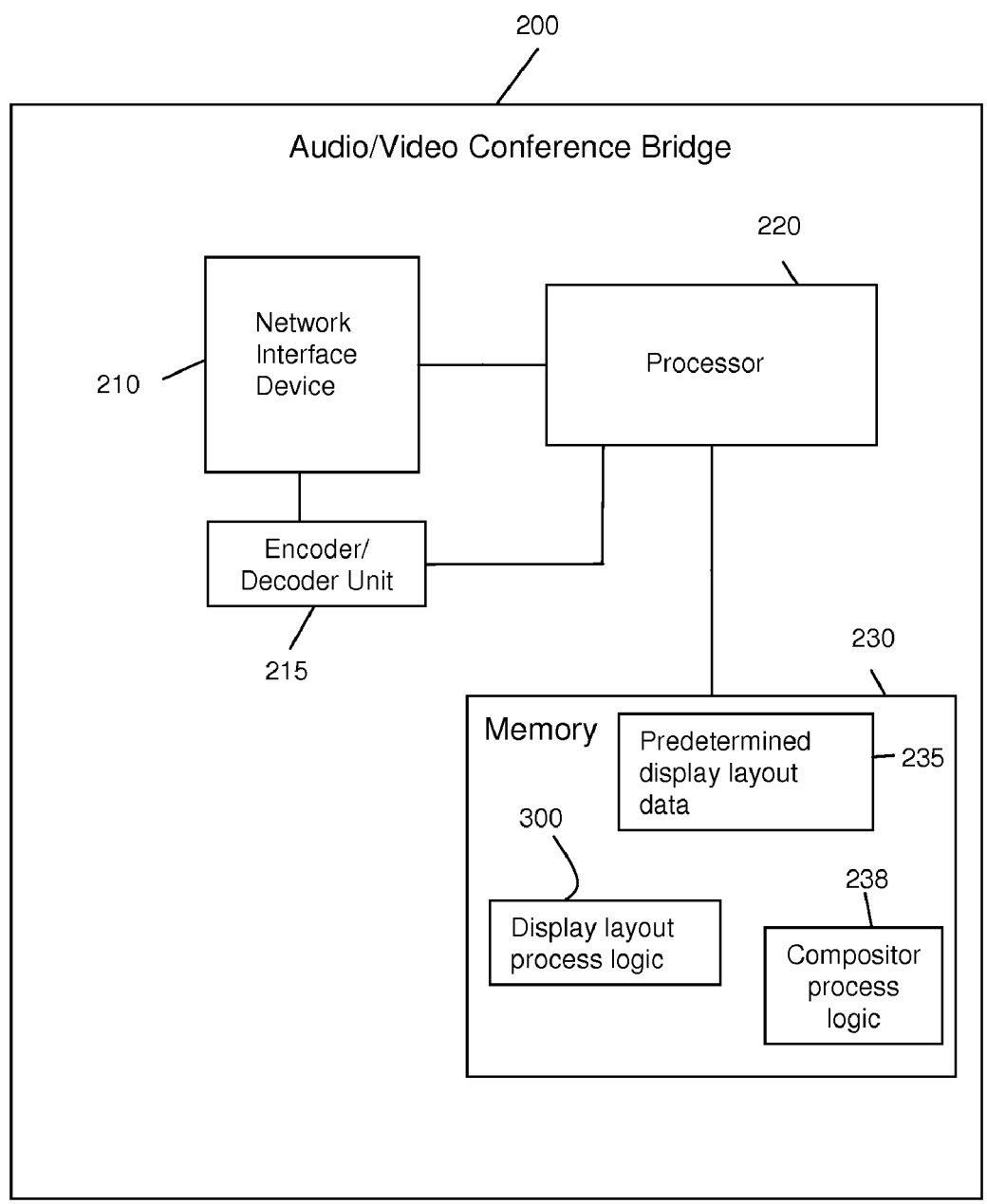
FIG. 2 is a block diagram of an example audio/video conference bridge apparatus that is configured with display layout logic to manage display layout selection and assignment of display positions of video and to implement video composition of video signals for participants of an audio/video conference.

Turning to FIG. 2, an example of a block diagram of the audio/video conference bridge is shown at 200. The example audio/video conference bridge 200 is a multi-point control unit that can support more than two endpoint units in a video conference. The audio/video conference bridge 200 includes a network interface device 210, an encoder/decoder unit 215, a processor 220 and a memory 230. The network interface device 210 receives audio and video data (i.e., video streams) of each participant U-1 to U-N in a conference from corresponding endpoint units 110(1)-110(N) over the network 120 (FIG. 1). The network interface device 210 also transmits display layouts with the video streams to respective endpoint units participating in the conference via the network 120.

The encoder/decoder unit 215 decodes audio/video streams received from endpoints and encodes composite audio/video streams to be sent back to the respective endpoints according to the display layout selection techniques described herein.

The processor 220 is coupled to the network interface device 210, to the encoder/decoder unit 215 and to memory 230. The processor 220 is a microprocessor or microcontroller that is configured to execute program logic instructions for carrying out various operations and tasks described herein. For example, the processor 220 can execute display layout process logic 300 stored in memory 230 in order to assign conference participants to corresponding display positions of a selected display layout. The memory 230 can include read only memory (ROM), random access memory (RAM), magnetic storage media, optical storage media, flash memory, electrical, or other physical/tangible memory.

The functions of processor 220 may be implemented by logic encoded in one or more tangible computer readable media (e.g., embedded logic such as an application specific integrated circuit, digital signal processor instructions, software that is executed by a processor, etc.) wherein memory 230 stores data used for the operations described herein and stores software or processor executable instructions that are executed to carry out the operations described herein.

The processor 220 can be programmed to perform, for example, layout selection operations, audio activity measurement, video stream selection, and video display position assignment. Further, processor 220 can instruct the encoder/decoder unit 215 to decode the video streams and to encode the composite video streams using compositor process logic 238 stored in memory 230.

The display layout process logic 300 may take any of a variety of forms, so as to be encoded in one or more tangible computer readable memory media or storage device for execution, such as fixed logic or programmable logic (e.g., software/computer instructions executed by a processor). In some embodiments, the processor 220 is an application specific integrated circuit (ASIC) that includes fixed digital logic, programmable logic, or a combination thereof. For example, the processor 220 may be embodied in digital logic gates in a fixed or programmable digital logic integrated circuit, where the digital logic gates are configured to perform instructions of the display layout process logic 300. In another form, the display layout process logic 300 may be embodied in one or more tangible computer readable storage media encoded with software comprising computer executable instructions that when executed are operable to perform the operations described herein for the process logic 300.

As shown in FIG. 2, the memory 230 also includes display layout data 235 and compositor logic 238. The display layout data 235 represents a plurality of predetermined display layouts. The compositor logic 238 includes instructions for combining raw video streams decoded at the encoder/decoder unit 215 into composite video streams for transmission back to the respective endpoint units 110(1)-110(N). The display layout data 235 includes data representing video display positions within video display layouts designed for use in displaying video streams of participants in a video conference. The processor 220 can assign one or more video streams of participants U-1 to U-N located at respective endpoint units 110(1)-110(N) to corresponding video display positions in the display layouts in accordance with the display layout process logic 300, as described below. In general, the display layout process logic 300 includes instructions that, when executed by the processor 220, cause the processor 220 to select a predetermined display layout from the plurality of display layouts stored in memory 230 based on a number of participants U-1 to U-N in a conference and assign each participant of the conference to a corresponding video display position in the first predetermined display layout.

Figure 3:
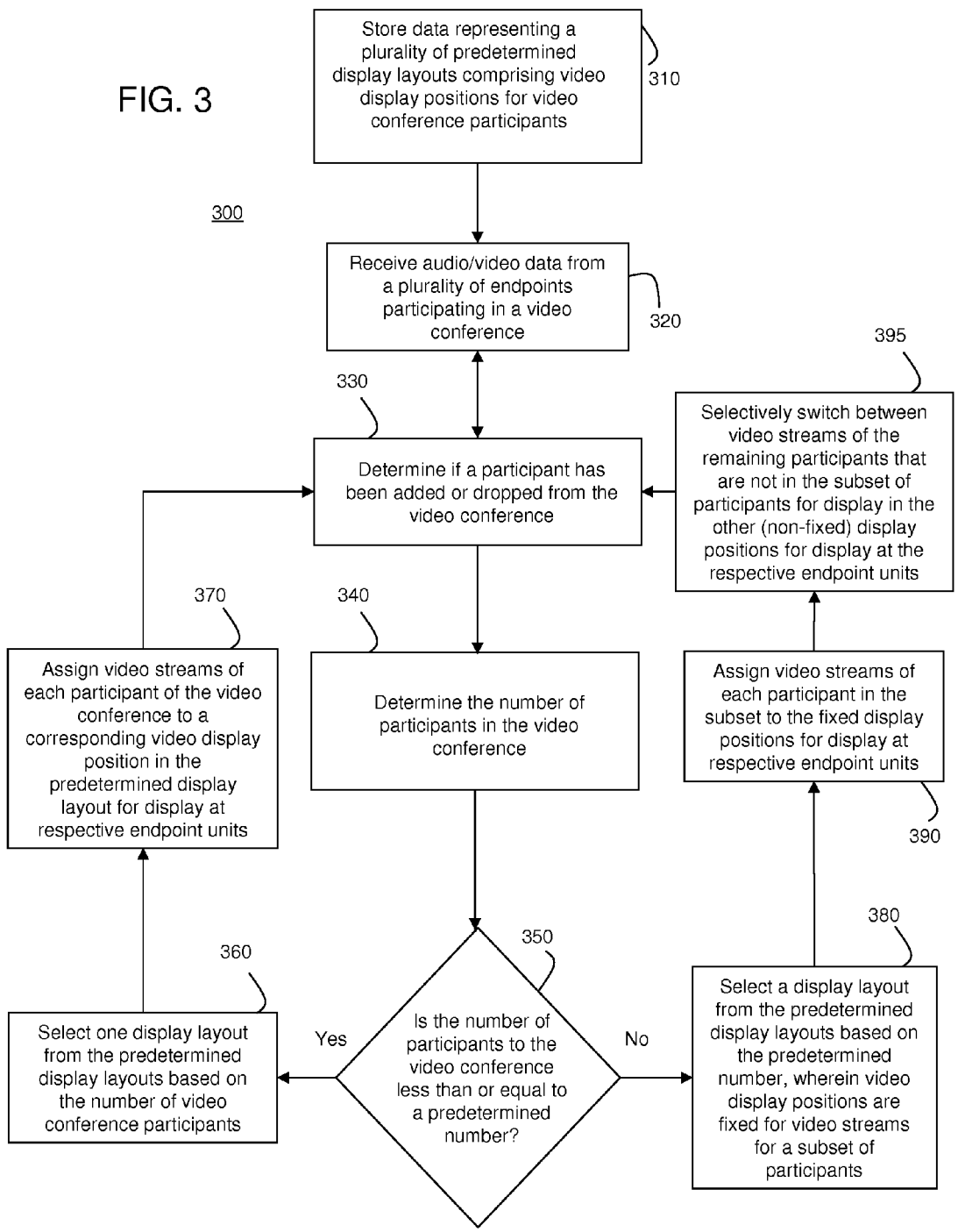
FIG. 3 is a flow chart depicting example operations of the display layout logic executed in the audio/video conference bridge apparatus.

Reference is now made to FIG. 3 for a description of the display layout process logic 300 for performing display layout selection and for assigning video streams to display positions within selected display layouts. At 310, data 235 representing a plurality of predetermined display layouts comprising video display positions for video streams of participants in a video conference. For example, the data representing the plurality of predetermined display layouts is stored in memory 230 of the audio/video conference bridge 200. In one example, the data representing the plurality of predetermined display layouts may be stored in memory 230 prior to initiation of a conference session. In this example, the display layouts may be preloaded into memory 230 of the audio/video conference bridge 200. In another example, the display layouts may be loaded into memory 230 of the audio/video conference bridge 200 during a conference session, as participants U-1 to U-N at respective endpoint units 110(1)-110(N) join and/or drop from the conference session.

As explained above, the endpoint units 110(1)-110(N) with participants U-1 to U-N participating in a conference session (e.g., a video conference session) are configured to capture and transmit video streams of each corresponding participant. At 320, the audio/video conference bridge 200 receives the video streams from the plurality of endpoint units participating in a conference session. Endpoint units (with corresponding participants) that are not initially part of the video conference session may later join the conference session at any time subsequent to the start of the conference, at which point, those endpoint units may transmit video streams for the corresponding participants to the audio/video conference bridge 200. Likewise, participants at endpoint units that are initially part of the video conference session may later drop out of the conference session at any time subsequent to the start of the conference, at which point, those endpoint units may stop transmitting video streams for the corresponding participants to the audio/video conference bridge 200.

At 330, a determination is made as to whether additional ones of the plurality of participants U-1 to U-N at respective endpoint units 110(1)-110(N) have been added to or dropped from the video conference session. After making this determination, at 340, a determination is made as to the total number of endpoint units (and thus, the total number of participants) that are participating in the video conference at a given point in time of the conference session. Upon determining the number of participants in the video conference session, at 350, compares the number of participants in the video conference session to a threshold, e.g., a predetermined number of participants, and decides whether the determined number of participants is less than or equal to the threshold. Operations 330, 340 and 350 are performed, for example, by the audio/video conference bridge 200.

The predetermined number may be, for example, a predetermined threshold number of participants for which the audio/video conference bridge 200 can store a unique video display layout. The predetermined number may be stored in memory 230 prior to the beginning of a conference session such that the audio/video conference bridge 200 assigns a corresponding predetermined display layout for different predetermined number values. For example, as explained below, the audio/video conference bridge 200 assigns a 1×1 display layout when the predetermined number of participants is one or two; the audio/video conference bridge assigns a 2×1 layout when the predetermined number of participants is three; the audio/video conference bridge 200 assigns a 2+1 layout when the predetermined number of participants is four; and the audio/video conference bridge 200 assigns a 2×2 layout when the predetermined number is five or more. These display layouts are simply examples of display layouts for corresponding predetermined number of participants, and it should be appreciated that any display layout may be assigned to any predetermined number of participants.

The predetermined number of participants, may, for example, determine the maximum number of video streams of participants that will be displayed at each participating endpoint unit based on the number of display positions in each of the corresponding display layouts. For example, if the predetermined number of participants is three, and if the corresponding display layout assigned to this predetermined number is a 2×1 layout, the maximum number of video streams of participants that will be display at each participating endpoint unit is two, since, as will become evident below, there are only two display positions in the corresponding 2×1 display layout.

If the number of participants in the video conference (determined by the audio/video conference bridge 200 at 340) is less than or equal to the threshold, then at 360, a particular display layout from the predetermined display layouts stored at 310 is selected, by for example, the audio/video conference bridge 200. The particular display layout is selected based on the number of participants in the video conference, as determined at 340. As stated above, each of the predetermined display layouts has one or more display positions that are assigned to video streams of participants in the video conference. The particular display layout selected at 360 is selected based on the number of display positions in the display layout and the determined number of participants in the video conference. After selecting the appropriate display layout, at 370, the audio/video conference bridge 200 assigns video streams of participants in the conference to a corresponding video display position in the particular display layout selected at 360. The display layout selected at 360 with the video streams of the participants are sent to (in respective composite video signals) for display at respective endpoint units participating in the conference. This allows for each participant to the conference to view video streams of the other participants in the conference at each of the respective endpoint units.

After assigning video streams of each participant to a display position in the selected video display layout, the audio/video conference bridge 200 reverts back to operation 330 to determine whether a participant has joined (i.e., if a participant's video stream has been added to the conference) or has left (i.e., if a participant's video stream has been dropped from the conference session). After making the determination at operation 330, operations 340 and 350 are performed as described above.

If the number of participants in the video conference (determined at 340) is greater than the predetermined number of participants, then at 380, the audio/video conference bridge 200 selects a display layout from the predetermined display layouts stored at 310 based on the predetermined number. The display layout that is selected based on the predetermined number may designate, for example, one or more video display positions are assigned as fixed video streams for one or more video streams of the participants in the conference (i.e., a subset of the participants in the conference). At 390, after selecting the display layout based on the predetermined number, the audio/video conference bridge 200 assigns each video stream of the subset of participants to corresponding display positions that are designated to be fixed positions. In other words, video streams for a subset of participants (also referred to herein as "fixed participants") are assigned to fixed display positions. In one example, the audio/video conference bridge 200 may assign each video stream from the subset of participants to designated display positions such that video streams of fixed participants are displayed to all other participants at respective endpoint units in the conference. In this example, each participant in the conference will see a display at his or her corresponding endpoint unit that displays at least all of the video streams for the subset of the participants, referred to as the "fixed video streams."

After assigning the video streams of each participant in the subset to the fixed display positions, at 395, an operation is performed to selectively switch between video streams of participants that are not in the subset of participants, that is, that are not one of the fixed participants. For example, if there are remaining display positions in the display layout that have not been assigned to fixed video streams (i.e., non-fixed display positions), a video stream of a participant not in the subset of participants is assigned to each of the remaining display positions. When there are more video streams to be displayed than there are remaining display positions, a scanning mode is invoked in which a selective switching is made between the multiple videos streams for display in the remaining display positions. For example, when there is one remaining display position and there are multiple, non-fixed participants (i.e., multiple participants not in the subset of fixed participants), the audio/video conference bridge 200 selectively switches between the video streams of the non-fixed participants for display in the one remaining display position. In this example, each participant in the conference will see a display layout showing the video streams of the fixed participants and a video stream of one of the non-fixed participants.

A video stream of a participant may be classified, e.g., by the audio/video conference bridge 200, as fixed or non-fixed in several ways, examples of which are described below in connection with FIG. 7. In general, the audio/video conference bridge 200 may automatically make this determination by analyzing audio statistics associated with each video stream; likewise, the audio/video conference bridge 200 may be controlled manually at one or more endpoint units to make this determination.

After selectively switching between video streams of non-fixed participants, the process reverts back to operation 330 to wait for a participant to be added or dropped from the video conference. Operations 340 and 350 are performed as described above.

For each endpoint involved in a conference session, the audio/video conference bridge 200 generates a composite video sequence or signal comprising video streams from one or more other endpoints for display at a display layout position determined according to the techniques described herein. The composite video sequence intended for a given endpoint may be, in general, different than the composite video sequence intended for other endpoints because each endpoint does not display the same video image as other endpoints (for a meaningful video conference to occur). The audio/video conference bridge encodes (via encoder/decoder unit 215) each composite video sequence for the respective endpoints and transmits the encoded composite video sequence, for transmission to the respective endpoints.

Figure 4:
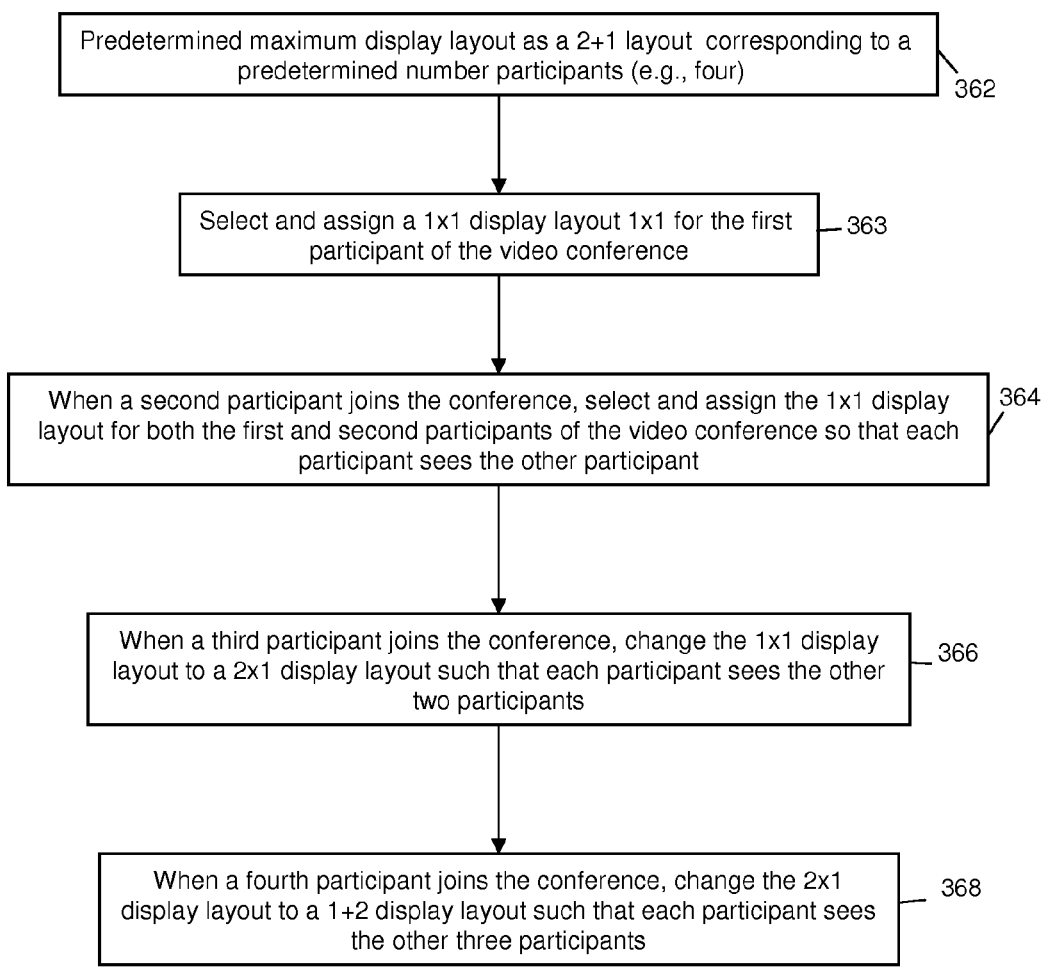
FIG. 4 is a flow chart depicting example display layout changes based on the number of participants in a video conference.
Figure 5:
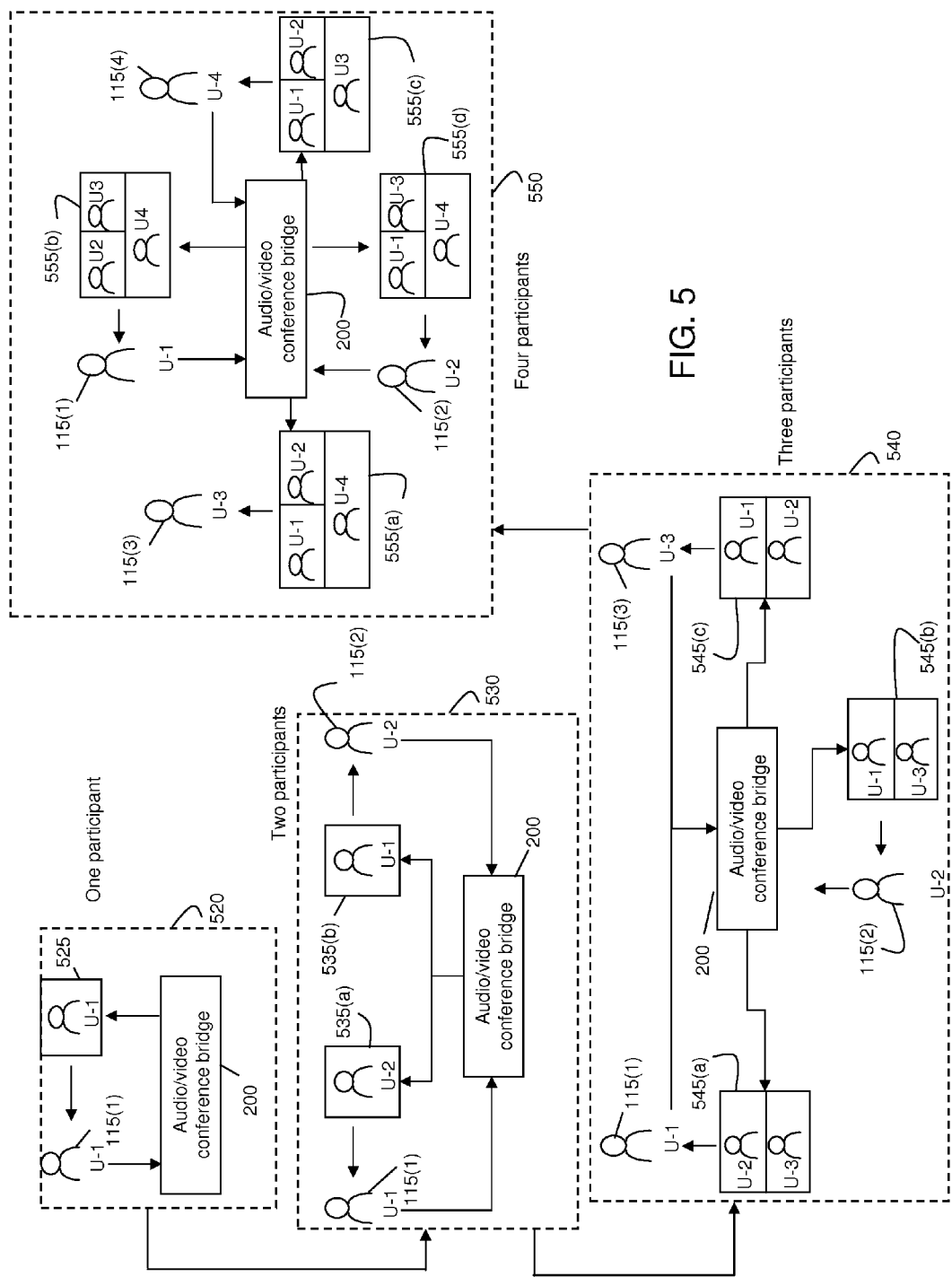
FIG. 5 shows example multiple display layout configurations that change as the number of participants in the video conference changes.

Reference is now made to FIGS. 4 and 5. FIG. 4 shows an example of a flow chart for the operation 360 of FIG. 3 to select a particular display layout based on the number of participants in a video conference. FIG. 5 shows a visual representation of the display layouts referred to in FIG. 4. It should be appreciated that FIG. 4 and FIG. 5 are examples of the process to select a particular display layout and that display layouts other than those shown in FIG. 5 may be selected by the audio/video conference bridge 200.

At 362, a predetermined maximum display layout, e.g., a 2+1 display layout, is configured and stored. Also at 362, a predetermined number of participants is configured and stored, e.g., in memory 230 of the audio/video conference bridge 200. In this example, the predetermined number of participants is four (4). An example of a 2+1 display layout is shown in FIG. 5, at 555(a)-555(d). The 2+1 display layout has three display positions that are configured to display three video streams from three endpoints.

At 363 in FIG. 4, a 1×1 display layout is selected, e.g., by the audio/video conference bridge 200, for the first participant of the video conference. The state where there is a single participant in the video conference is represented at 520 in FIG. 5 in which display layout 525 displays participant U-1 to himself. At 364, when a second participant joins the conference, a 1×1 display layout for the first and second participants in the video conference is selected and assigned, e.g., by the e.g., by the audio/video conference bridge 200, such that each participant sees the other participant. The state where there are two participants in the video conference is represented at 530 in FIG. 5 in which display layout 535(a) has one display position to display participant U-2 to participant U-1, and similarly display layout 535(b) has one display position to display participant U-1 to participant U-2.

At 366, when a third participant joins the conference, the 1×1 display layout is changed to a 2×1 display layout, e.g., by the audio/video conference bridge 200, such that each participant sees the other two participants. The state where there are three participants in the video conference is represented at 540 in FIG. 5. Display layout 545(a) has two display positions to display participants U-2 and U-3, respectively, to participant U-1, display layout 545(b) has two display positions to display participants U-1 and U-3, respectively, to participant U-2, and display layout 545(c) has two display positions to display participants U-1 and U-2, respectively, to participant U-3.

At 368 in FIG. 4, when a fourth participant joins the conference, the 2×1 display layout is changed to a 2+1 display layout, e.g., by the audio/video conference bridge 200, such that each participant sees the other three participants. The state where there are four participants in the video conference is shown at 550 in FIG. 5. Display layout 555(a) has three display positions to display participants U-1, U-2 and U-4, respectively, to participant U-3; display layout 555(b) has three display positions to display participants U-2, U-3 and U-4, respectively, to participant U-1; display layout 555(c) has three display positions to display participants U-1, U-2 and U-3, respectively, to participant U-4; and display layout 555(d) has three display positions to display participants U-1, U-3 and U-4, respectively, to participant U-2.

Operations 362 to 368 in FIG. 4 allow for each participant in a conference to see the other participants up to a predetermined number of participants. As depicted in FIG. 3, when more than the number of participants exceeds the predetermined number, e.g., when a fifth participant joins the conference, the predetermined maximum display layout is reached. The audio/video conference bridge selectively switches between videos streams of the fifth and additional participants according to the techniques described herein.

Reference is now made to FIG. 6. FIG. 6 shows an example video conference session with a plurality of fixed video streams (for a subset of participants) and non-fixed video streams (for participants not in the subset of participants). As explained herein, a "fixed" stream is a video stream that has been assigned a static position in a display layout and non-fixed video streams are video streams that are selectively switched in (cycled through) a position in a display layout. In FIG. 6, participants U-1, U-2 and U-3 are designated as participants that are part of the subset, i.e., participants whose video streams are designated as fixed video streams (as indicated by the asterisk *), and participants U-4, U-5 and U-6 are designated as participants that are not part of the subset, i.e., participants whose video streams are non-fixed video streams. Associated with endpoint device 110(1)-110(6) is a video display device 610(1)-610(6), respectively. The video display devices are any type of video display screen or monitor now known or later developed. The display devices 610(1)-610(6) display video streams in the respective display layout positions based on the composite video signal sent by the audio/video conference bridge 200.

In general, every participant to the conference session sees other participants that are part of the subset of participants, that is, other participants whose video stream is designated by the audio/video conference bridge as a fixed video stream. For example, participant U-1 always receives on display 610(1) of endpoint 110(1) video streams for participants U-2 and U-3. Similarly, participant U-4 always receives on display 610(4) video streams for participants U-1, U-2 and U-3. In the example of FIG. 6, the aforementioned predetermined number (of participants) stored in memory 230 of the audio/video conference bridge 200 is four, and a corresponding 2+1 layout is associated with this predetermined layout, as described above for FIGS. 4 and 5. When the number of participants are less than or equal to four, each participant is presented with the corresponding predetermined layout (the 2+1 layout) associated with the predetermined number. In other words, in FIG. 6, participants U-1 to U-4 joined the conference prior to exceeding the predetermined number of participants, and therefore they are presented at their respective endpoint units with the 2+1 display layout. When new additional participants join the conference such that the number of participants is greater than the predetermined number, the new participants are presented with a new display layout. For example, in FIG. 6, the addition of participants U-5 and U-6 exceeds the predetermined number, and participants U-5 and U-6 are presented with a new display layout (e.g., a 2×2 display layout). At endpoint 110(5), there is one display position in the 2×2 display layout presented to participant U-5 on display 610(5) that is available for display of a video stream for either participant U-4 or participant U-6. The other display positions are taken up by the video streams for the fixed participants U-1, U-2 and U-3. At any given time, the audio/video conference bridge 200 may select the video stream for either participant U-4 or participant U-6 for display in the remaining available display position. Similarly, at endpoint 110(6), there is one display position in the 2×2 display layout presented to participant U-6 on display 610(6) that is available for display of a video stream for either participant U-4 or participant U-5 since the other display positions are taken up by the video streams for the fixed participants U-1, U-2 and U-3. At any given time, the audio/video bridge 200 may select the video stream for either participant U-4 or participant U-5 for display in the remaining available display position.

In one example, when new participants join the conference such that the number of participants is greater than the predetermined number, the audio/video conference bridge 200 assigns the video streams for the fixed participants (U-1 to U-3) to fixed display positions in corresponding display layouts and assigns the video streams for the non-fixed participants (U-4 to U-6) into non-fixed display positions in corresponding display layouts. The audio/video conference bridge 200 may designate video streams of participants as being fixed or non-fixed in several ways. For example, the audio/video conference bridge 200 measures audio activity of each participant in a video conference, as described in FIG. 7 below, to generate audio statistics for each participant and determine the subset of participants (fixed participants) based on the audio statistics.

The audio/video conference bridge 200 may also determine the subset of fixed participants (fixed participants) in response to a manual command received from a participant at an endpoint unit. For example, in FIG. 6, there is a keypad 620 at endpoint 110(2). Participant U-2 may use the keypad 620 to send a command that is configured to designate video streams of the other participants as fixed or non-fixed. In this example, the keypad 620 may use dual-tone multi-frequency (DTMF) signals to communicate with the audio/video conference bridge 200 via a corresponding endpoint unit 110(2) in order to designate video streams of participants as fixed or non-fixed such that the conference bridge can assign display positions to video streams for participants accordingly. In another example, the keypad may only have two keys or two key sequences, one for dropping a fixed video stream of a participant from the conference and one for requesting to add a video stream of a participant as a fixed video stream. In this example, in FIG. 6, participant U-2 could press the keys at any time to drop a fixed video stream from the conference session or to add a fixed video stream to the conference session.

Reference is now made to FIG. 7. FIG. 7 shows an example of a process 700 used by the audio/video conference bridge 200 to automatically designate video streams of participants as fixed or non-fixed by measuring audio activity of each participant during a conference session. In general, in FIG. 7, activity levels of each participant in the video conference based on the amount of time that each participant in the video conference speaks (or is otherwise generating audio) in order to determine the subset of fixed participants. Participants with high relative activity levels are designated as part of the subset of fixed participants. Thus, at any given time, a participant may be designated as a fixed participant or a non-fixed participant. Consequently, the term "fixed" is used herein to indicate that the video stream for a given participant is to be considered essential or fixed in the display to other participants at a given period of time during the conference session, but that can change throughout the conference session.

At 710, an activity level value (referred to as "SA") is set to zero for each participant in the conference. Also, a short term activity level value (referred to as "AL(st)") to zero and a long term activity level value (referred to as "AL(lt)") are set to zero for each participant. A tick timer is also set at one tick per second. Operation 710 is performed by the audio/video conference bridge, for example.

At 720, for every tick (i.e., at every second), the short term activity level value and long term activity level value are updated for each participant, e.g., by the audio/video conference bridge 200. In general, the short term activity level value is determined based on a fraction of time that a participant speaks (or generates audio in any manner) in a conference over a recent short time period. The short term activity level value controls the delay of a participant to become a fixed participant when he or she speaks (or generates audio in any manner) such that recent relevant participants may be designated as fixed participants. Likewise, in general, the long term activity level value is determined based on a fraction of time that a participant speaks (or generates audio) in the conference over a long term time period. The long term activity level is used to prevent a long term participant from being dropped as a fixed participant if he or she is not a recent relevant participant.

At 730, an activity level value is computed, e.g., by the audio/video conference bridge 200, based on the formula shown in step 730 in FIG. 7. It should be appreciated that the a value in this calculation is a pre-determined constant controlling the ratio of the short term and long term activity level values. A large value of a favors the short term activity level, while a small value of a favors the long term activity level value. At 740, the audio/video conference bridge 200 adds a state dependent constant (referred to as "C(state)") to each activity level value. The state dependent constant can be defined as 1 or 0, with a 1 definition indicating that a participant is contributing as a fixed video stream and with a 0 definition indicating otherwise. At 750, the participants in the conference are ordered, e.g., by the audio conference bridge 200, based on the activity level values, and, at 760, assigns a subset of the participants with top activity (relatively higher activity) level values to be the fixed participants. The fixed participants are assigned, e.g., by the audio/video conference bridge 200 to fixed display positions in the display layouts, as described above, and the non-fixed participants are assigned to non-fixed positions in the display layouts such that the display layout selectively switches between video streams of the multiple remaining participants that are not in the subset of fixed participants. For example, the display layouts may selectively switch between the remaining participants at predetermined time intervals.

In sum, a method is provided comprising: at a conference bridge apparatus that is configured to communicate with a plurality of endpoint units, storing data representing a plurality of display layouts comprising video display positions for participants in a video conference, determining a number of participants in the video conference, and comparing the number of participants in the video conference to a threshold. When the number of participants to the video conference is less than or equal to the threshold, a first display layout of the plurality of display layouts is selected based on the number of participants and a video stream for each participant in the video conference is assigned to a corresponding video display position in the first display layout. When the number of participants is greater than the threshold, a second display layout is selected in which video display positions are fixed for video streams for a subset of the participants and video streams of multiple remaining participants that are not in the subset of participants are selectively switched between for display in at least one display position.

Thus, one of the positions in each layout is used as a shared position that is assigned to a video stream of participants not assigned to fixed positions in the layout. The shared position can be used in a scanning manner such that video streams of participants not assigned to fixed positions in the layouts are classified as scanning streams and are displayed in the non-fixed (shared) position over a predetermined time interval.

In addition, an apparatus is provided comprising: a network interface device configured for communication over a network with a plurality of endpoint units, an encoder unit configured to encode video signals that are to be sent to the plurality of endpoints according to display layouts for display at respective ones of the plurality of endpoints and a processor configured to be coupled to the network interface and to the encoder unit. The processor is configured to: store data representing a plurality of display layouts comprising video display positions for participants in a video conference, determine a number of participants in the video conference and compare the number of participants in the video conference to a threshold. When the number of participants in the video conference is less than or equal to the threshold, the processor is configured to select a first display layout of the plurality of display layouts based on the number of participants and to assign a video stream for each participant in the video conference to a corresponding video display position in the first display layout. When the number of participants after the one or more participants are added is greater than the threshold, the processor is configured to select a display layout in which video display positions are fixed for video streams for a subset of the participants and to selectively switch between video streams of multiple remaining participants that are not in the subset of participants for display in at least one display position.

Similarly, one or more computer readable storage media is provided that is encoded with software comprising computer executable instructions and when the software is executed operable to: at a conference bridge apparatus that is configured to communicate with a plurality of endpoint units store data representing a plurality of display layouts comprising video display positions for participants in a video conference, determine a number of participants in the video conference and compare the number of participants in the video conference to a threshold. When the number of participants in the video conference is less than or equal to the threshold, the software is executed operable to select a first display layout of the plurality of display layouts based on the number of participants and assign a video stream for each participant in the video conference to a corresponding video display position in the first display layout. When the number of participants after the one or more participants are added is greater than the threshold, the software is executed operable to select a display layout in which video display positions are fixed for video streams for a subset of the participants and to selectively switch between video streams of multiple remaining participants that are not in the subset of participants for display in at least one display position.

The above description is intended by way of example only. Various modifications and structural changes may be made therein without departing from the scope of the concepts described herein and within the scope and range of equivalents of the claims.

What is claimed is:

1. A method comprising:
   at a conference bridge apparatus that is configured to communicate with a plurality of video conference endpoint units, storing data representing a plurality of display layouts comprising video display positions for participants in a video conference;
   determining a number of participants in the video conference;
   comparing the number of participants in the video conference to a threshold;
   when the number of participants in the video conference is less than or equal to the threshold, selecting a first display layout of the plurality of display layouts based on the number of participants and assigning a video stream for each participant in the video conference to a corresponding video display position in the first display layout; and
   when the number of participants is greater than the threshold, selecting a second display layout in which video display positions are fixed for video streams for a subset of the participants and selectively switching between video streams of multiple remaining participants that are not in the subset of participants for display in at least one display position.

2. The method of claim 1, further comprising:
   detecting when one or more participants are added to the video conference;
   comparing the number of participants in the video conference after the one or more participants are added with the threshold; and
   when the number of participants after the one or more participants are added is less than or equal to the threshold, changing to a particular display layout of the plurality of display layouts based on the number of participants after the one or more participants are added and assigning the video stream for each participant to a corresponding video display position in the particular display layout.

3. The method of claim 1, further comprising measuring audio activity of each participant in the video conference to generate audio statistics for each participant, and determining the subset of participants based on the audio statistics for the respective participants.

4. The method of claim 3, wherein measuring comprises measuring activity levels of each participant in the video conference based on the amount of time that each participant in the video conference generates audio in order to determine the subset of participants such that one or more participants with relatively high activity levels are part of the subset of participants.

5. The method of claim 3, further comprising updating the measured audio statistics for the participants at predetermined time intervals.

6. The method of claim 1, wherein selecting switching comprises switching between the multiple remaining participants at predetermined time intervals.

7. The method of claim 1, further comprising determining the subset of participants in response to a command received from an endpoint unit.

8. The method of claim 1, and further comprising generating a composite video signal for respective ones of the plurality of endpoints based on the display layouts selected, encoding the composite video signal for the respective endpoints and transmitting the composite video signal from the conference bridge apparatus to the respective endpoints.

9. An apparatus comprising:
- a network interface device configured for communication over a network with a plurality of endpoint units;
- an encoder unit configured to encode video signals that are to be sent to the plurality of endpoints according to display layouts for display at respective ones of the plurality of endpoints; and
- a processor configured to be coupled to the network interface device and to the encoder unit, the processor configured to:
  - store data representing a plurality of display layouts comprising video display positions for participants in a video conference;
  - determine a number of participants in the video conference;
  - compare the number of participants in the video conference to a threshold; and
  - when the number of participants in the video conference is less than or equal to the threshold, select a first display layout of the plurality of display layouts based on the number of participants and assign a video stream for each participant in the video conference to a corresponding video display position in the first display layout; and
  - when the number of participants after the one or more participants are added is greater than the threshold, select a display layout in which video display positions are fixed for video streams for a subset of the participants and selectively switch between video streams of multiple remaining participants that are not in the subset of participants for display in at least one display position.

10. The apparatus of claim 9, wherein the processor is further configured to:
- detect when one or more participants are added to the video conference;
- compare the number of participants in the video conference after the one or more participants are added with the threshold; and
- when the number of participants after the one or more participants are added is less than or equal to the threshold, change to a particular display layout of the plurality of display layouts based on the number of participants after the one or more participants are added and assigning the video stream for each participant to a corresponding video display position in the particular display layout.

11. The apparatus of claim 9, wherein the processor is further configured to measure audio activity of each participant in the video conference to generate audio statistics for each participant, and determine the subset of participants based on the audio statistics for the respective participants.

12. The method of claim 10, wherein the processor is configured to update the measured audio statistics for the participants at predetermined time intervals.

13. The apparatus of claim 9, wherein the processor is configured to selectively switch between the multiple remaining participants at predetermined time intervals.

14. The apparatus of claim 9, wherein the processor is configured to determine the subset of participants in response to a command received from an endpoint unit.

15. The apparatus of claim 9, wherein the processor is configured to:
- generate a composite video signal for respective ones of the plurality of endpoints based on the display layouts selected; and
- supply the composite video signal to the encoder unit to encode the composite video signal for the respective endpoints for transmission to the respective endpoint units.

16. One or more computer readable storage media encoded with software comprising computer executable instructions and when the software is executed operable to:
- at a conference bridge apparatus that is configured to communicate with a plurality of endpoint units, store data representing a plurality of display layouts comprising video display positions for participants in a video conference;
- determine a number of participants in the video conference;
- compare the number of participants in the video conference to a threshold;
- when the number of participants in the video conference is less than or equal to the threshold, select a first display layout of the plurality of display layouts based on the number of participants and assign a video stream for each participant in the video conference to a corresponding video display position in the first display layout; and
- when the number of participants after the one or more participants are added is greater than the threshold, select a display layout in which video display positions are fixed for video streams for a subset of the participants and selectively switch between video streams of multiple remaining participants that are not in the subset of participants for display in at least one display position.

17. The computer readable storage media of claim 16, further comprising instructions operable to measure audio activity of each participant in the video conference to generate audio statistics for each participant, and determine the subset of participants based on the audio statistics for the respective participants.

18. The computer readable storage media of claim 17, wherein the instructions that are operable to measure audio activity comprise instructions operable to measure activity levels of each participant in the video conference based on the amount of time that each participant in the video conference generates audio in order to determine the subset of participants such that the one or more participants with relative high activity levels are part of the subset of participants.

19. The computer readable storage media of claim 16, wherein the instructions that are operable to selectively switch between video streams comprise instructions operable to switch between the multiple remaining participants at predetermined time intervals.

20. The computer readable storage media of claim 16, further comprising instructions operable to determine the subset of participants in response to a command received from an endpoint unit.

* * * * *